United States Patent
Choi et al.

(10) Patent No.: US 9,301,106 B2
(45) Date of Patent: Mar. 29, 2016

(54) METHOD AND APPARATUS FOR SUPPORTING GROUP DELEGATOR IN WIRELESS CONNECTION SYSTEM SUPPORTING MACHINE-TO-MACHINE COMMUNICATION

(75) Inventors: Jinsoo Choi, Anyang-si (KR); Hangyu Cho, Anyang-si (KR); Inuk Jung, Anyang-si (KR); Youngsoo Yuk, Anyang-si (KR); Jinsam Kwak, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 14/239,477

(22) PCT Filed: Aug. 16, 2012

(86) PCT No.: PCT/KR2012/006509
§ 371 (c)(1),
(2), (4) Date: Feb. 18, 2014

(87) PCT Pub. No.: WO2013/025055
PCT Pub. Date: Feb. 21, 2013

(65) Prior Publication Data
US 2014/0206408 A1  Jul. 24, 2014

Related U.S. Application Data

(60) Provisional application No. 61/524,780, filed on Aug. 18, 2011.

(51) Int. Cl.
*H04W 4/08* (2009.01)
*H04W 4/00* (2009.01)

(52) U.S. Cl.
CPC .............. *H04W 4/08* (2013.01); *H04W 4/005* (2013.01)

(58) Field of Classification Search
None
See application file for complete search history.

(56) References Cited

U.S. PATENT DOCUMENTS

2008/0233989 A1  9/2008  Kim et al.
2012/0230302 A1*  9/2012  Calcev et al. ................ 370/336

(Continued)

FOREIGN PATENT DOCUMENTS

KR  1020090008509  1/2009
KR  1020090039573  4/2009

OTHER PUBLICATIONS

Zhou, et al., "Proposed Text for network access entry for a large number of M2M devices," IEEE 802.16 Broadband Wireless Access Working Group, IEEE C802.16p-11/0131r1, XP017780773, Jul. 2011, 12 pages.

(Continued)

*Primary Examiner* — Philip Sobutka
(74) *Attorney, Agent, or Firm* — Lee, Hong, Degerman, Kang & Waimey (57) ABSTRACT

The present invention provides various methods and an apparatuses for supporting a group delegator (GD) in a wireless access system supporting Machine to Machine (M2M) communication. A method for selecting the group delegator (GD) in a wireless access system supporting the Machine to Machine (M2M) communication, according to one embodiment of the present invention, comprises the steps of: an M2M device belonging to an M2M group receiving a broadcasting message including a first critical value, which is used for selecting the GD; an M2M device generating a first random value, which is used for selecting the GD; and selecting the GD by comparing the first critical value and the first random value.

6 Claims, 6 Drawing Sheets

(56) References Cited

U.S. PATENT DOCUMENTS

| | | | |
|---|---|---|---|
| 2012/0231828 A1* | 9/2012 | Wang et al. | 455/509 |
| 2013/0017856 A1* | 1/2013 | Murias et al. | 455/522 |

OTHER PUBLICATIONS

Cha, et al., "Distribution of Initial Ranging Access for Network Reentry," IEEE 802.16 Broadband Wireless Access Working Group, IEEE C802.16p-11/0020, XP017614407, Mar. 2011, 16 pages.

Colban, "Reply to IEEE 802.16p Machine to Machine (M2M): Proposed Text from Power Saving (PWR) Rapporteur Group," IEEE 802.16 Broadband Wireless Access Working Group, IEEE C802.16p-11/0052, XP017614485, Mar. 2011, 18 pages.

Wang, et al., "Proposed Text for Network Reentry for a Large Number of M2M Devices," IEEE S802.16p-11_0008, XP017780596, Mar. 2011, 8 pages.

European Patent Office Application Serial No. 12824268.2 Search Report dated Mar. 4, 2015, 8 pages.

Kuo, et al., "Text Clean-up for Selection of M2M Group Delegate", IEEE 802.16 Broadband Wireless Access Working Group, IEEE 16-12-0161-01-000P, Mar. 2012, 4 pages.

Huang, et al.,"M2M group identifier functionalities and design requirements", IEEE 802.16 Broadband Wireless Access Working Group, IEEE C802.16p-11/0152r1, Jul. 2011, 5 pages.

PCT International Application No. PCT/KR2012/006509, Written Opinion of the International Searching Authority dated Jan. 28, 2013, 16 pages.

* cited by examiner

METHOD AND APPARATUS FOR SUPPORTING GROUP DELEGATOR IN WIRELESS CONNECTION SYSTEM SUPPORTING MACHINE-TO-MACHINE COMMUNICATION

CROSS-REFERENCE TO RELATED APPLICATIONS

This application is the National Stage filing under 35 U.S.C. 371 of International Application No. PCT/KR2012/006509, filed on Aug. 16, 2012, which claims the benefit of U.S. Provisional Application Ser. No. 61/524,780, filed on Aug. 18, 2011, the contents of which are hereby incorporated by reference herein in their entirety.

TECHNICAL FIELD

The present invention relates to a wireless access system supporting Machine to Machine (M2) communication, and more particularly, to various methods and apparatuses for supporting a Group Delegator (GD).

BACKGROUND ART

An M2M communication environment according to the present invention will be described below in brief.

As its appellation implies, M2M communication refers to communication between electronic devices. In a broad sense of the term, M2M communication means wired or wireless communication between electronic devices or communication between a human-controlled device and a machine. Recently, it is typical to mean wireless communication between electronic devices without human intervention by M2M communication.

In the early 1990s when the concept of M2M communication was introduced, M2M communication was regarded merely as remote control or telematics and its market was very limited. However, the past few years have witnessed the rapid development of M2M communication and thus its market has been boosted so much as to attract worldwide interest. Particularly, M2M communication has significantly affected fleet management in Point Of Sales (POS) and security-related application markets, remote monitoring of machines and facilities, operation time measurement of construction machines, and smart metering of automatically measuring heat or electricity consumption.

M2M communication will find its applications for various usages in conjunction with legacy mobile communication, ultra-high speed wireless Internet, or low-power communication solutions such as Wireless Fidelity (Wi-Fi) and Zigbee. Therefore, M2M communication will expand its market to a Business to Consumer (B2C) market beyond a Business to Business (B2B) market.

In the era of M2M communication, every machine equipped with a Subscriber Identity Module (SIM) card is capable of data transmission and reception, thus allowing remote management and control. For example, the application range of the M2M communication technology is very broad, inclusive of many devices and equipment such as vehicle, truck, train, container, automatic vending machine, gas tank, etc.

Conventionally, terminals are usually managed individually and thus one-to-one communication is conducted between a base station and a terminal If a number of M2M devices communicate with a base station in a one-to-one communication scheme, it is expected that signaling between each of the M2M devices and the BS will cause network overhead. As described before, if M2M communication becomes rapidly widespread, overhead caused by communication between M2M devices or between M2M devices and a base station may be a problem.

Particularly when many M2M devices are located within the area of one base station, all of the M2M devices may perform a ranging procedure for initial network entry or network reentry from idle mode. In this case, there may be a shortage of ranging codes for the M2M devices. If the M2M devices perform the ranging procedure simultaneously, the network may suffer from overhead and the ranging procedure may not be performed normally due to collision between M2M devices during ranging.

A primary requirement for M2M devices is low power consumption. Therefore, if all M2M devices perform ranging to a base station, the power consumption of the M2M devices is high.

DISCLOSURE

Technical Problem

An object of the present invention devised to solve the problem lies on an efficient communication method for a Machine to Machine (M2M) device.

Another object of the present invention devised to solve the problem lies on a method for selecting a Group Delegator (GD) for M2M devices and enabling the selected GD to perform a ranging procedure on behalf of the M2M devices during initial network entry or network reentry.

Another object of the present invention devised to solve the problem lies on a method for determining a ranging code for use in a ranging procedure of a GD.

A further object of the present invention devised to solve the problem lies on a method for selecting and reselecting a GD for an M2M group and a method for reselecting a GD in the event of a ranging failure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the above technical objects, the present invention provides various methods and apparatuses for supporting a Group Delegator (GD) in a wireless access system supporting Machine to Machine (M2M) communication.

The object of the present invention can be achieved by providing a method for selecting a GD in a wireless access system supporting M2M communication, including if a Group Member (GM) of an M2M group does not receive any information related to a dedicated ranging code used for network reentry from a Base Station (BS), receiving a broadcast message including a second threshold changed from a first threshold used for selecting a GD of the M2M group, generating a random value for selecting a GD, and reselecting a GD by comparing the second threshold with the random value.

If the second threshold is equal to or larger than the random value, the M2M device may be selected as the GD and if the second threshold is smaller than the random value, the M2M device may operate as a GM of the M2M group.

The method may further include, if the M2M device is selected as the GD, transmitting a ranging code for network reentry on behalf of the M2M group.

The broadcast message may be a System Configuration Descriptor (SCD) message or an M2M Group MAC Control (MGMC) message.

In another aspect of the present invention, provided herein is a method for selecting a GD in a wireless access system supporting M2M communication, including if a BS does not receive a dedicated ranging code for network reentry from an M2M group, broadcasting a broadcast message including a second threshold changed from a first threshold used for selecting a GD of the M2M group by the BS, and receiving the dedicated ranging code for network reentry from a GD selected from the M2M group by the BS. The GD is selected based on the second threshold and a random value generated by an M2M device of the M2M group.

If the second threshold is equal to or larger than the random value, the M2M device may be selected as the GD and if the second threshold is smaller than the random value, the M2M device may operate as a GM of the M2M group.

The broadcast message may be an SCD message or an MGMC message.

In another aspect of the present invention, provided herein is an M2M device for selecting a GD in a wireless access system supporting M2M communication, including a Radio Frequency (RF) unit, and a processor supporting GD selection.

If a GM of an M2M group does not receive any information related to a dedicated ranging code used for network reentry from a BS, the M2M device receives a broadcast message including a second threshold changed from a first threshold used for selecting a GD of the M2M group, generates a random value for selecting a GD through the processor, and reselects a GD by comparing the second threshold with the random value.

If the second threshold is equal to or larger than the random value, the M2M device may be selected as the GD and if the second threshold is smaller than the random value, the M2M device may operate as a GM of the M2M group.

If the M2M device is selected as the GD, the M2M device may transmit a ranging code for network reentry through the RF unit on behalf of the M2M group.

The broadcast message may be an SCD message or an MGMC message.

In another aspect of the present invention, provided herein is a BS for supporting selection of a GD in a wireless access system supporting M2M communication, including an RF unit and a processor supporting GD selection. If the BS does not receive a dedicated ranging code for network reentry from an M2M group, the BS broadcasts, through the RF unit, a broadcast message including a second threshold changed from a first threshold used for selecting a GD of the M2M group, and receives the dedicated ranging code for network reentry from a GD selected from the M2M group through the RF unit, and the GD is selected based on the second threshold and a random value generated by an M2M device of the M2M group.

If the second threshold is equal to or larger than the random value, the M2M device may be selected as the GD and if the second threshold is smaller than the random value, the M2M device may operate as a GM of the M2M group.

The broadcast message may be an SCD message or an MGMC message.

The afore-described aspects of the present invention are merely a part of preferred embodiments of the present invention. Those skilled in the art will derive and understand various embodiments reflecting the technical features of the present invention from the following detailed description of the present invention.

Advantageous Effects

Embodiments of the present invention have the following effects.

First, broadcast data can be transmitted efficiently to M2M devices.

Secondly, a GD can be selected efficiently for M2M devices using a method of the present invention.

Thirdly, since a GD operates on behalf of an M2M group, power can be saved for M2M devices of the M2M group and an access delay can be reduced during network reentry.

Fourthly, if network reentry is failed, a GD is reselected. Therefore, power can be saved for M2M devices and an access delay can be reduced during network reentry.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention described below provide various methods and apparatuses for supporting a Group Delegator (GD) in a wireless access system supporting Machine to Machine (M2M) communication.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description has been mainly made of a data transmission and reception relationship between a Base Station (BS) and a Mobile Station (MS). A BS refers to a terminal node of a network, which directly communicates with an MS. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an Advanced Base Station (ABS), an access point, etc.

The term MS may be replaced with a User Equipment (UE), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, an MS may serve as a transmitter and a BS may serve as a receiver, on UpLink (UL). Likewise, the MS may serve as a receiver and the BS may serve as a transmitter, on DownLink (DL).

The embodiments of the present invention may be supported by standard documents disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, a 3GPP LTE-Advanced (LTE-A) system, and a 3GPP2 system. That is, the steps or parts, which are not described to clearly reveal the technical idea of the present invention, in the embodiments of the present invention may be explained by the above documents.

All terms used in the embodiments of the present invention may be explained by the standard documents. Particularly, the embodiments of the present invention may be supported by at least one of IEEE 802.16 specifications, that is, p802.16e-2004, P802.16e-2005, P802.16m, P802.16p, and P802.16.1b documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. Those of ordinary skilled in the art will recognize that various changes and modifications of the embodiments described herein can be made without departing from the scope and spirit of the disclosure. In addition, descriptions of well-known functions and constructions may be omitted for clarity and conciseness. Like reference numerals denote the same components throughout the specification.

If it is said throughout the specification that a part "includes" a component, this means that the part may further include another component, not excluding other components unless otherwise specified. In addition, the terms "unit", "-er", "module", etc. signify a unit that processes at least one function or operation and may be implemented in hardware, software, or a combination of hardware and software.

Specific terms used in the embodiments of the present invention are provided to assist the understanding of the present invention and may be replaced with other terms within the technical scope of the present invention.

1. Overview of M2M Device

The following description is given with the appreciation that M2M communication is conducted (1) between M2M devices through a BS, (2) between a BS and M2M devices without human intervention, or (3) between M2M devices. Accordingly, an M2M device refers to a terminal capable of supporting M2M communication in the above sense.

An access service network for M2M service is defined as an M2M Access Service Network (M2M ASN) and a network entity that communicates with M2M devices is referred to as an M2M server. The M2M server executes an M2M application and provides an M2M-specific service to one or more M2M devices. An M2M feature refers to a characteristic of an M2M application and one or more features may be required to provide an application. An M2M device group is a group of M2M devices sharing one or more common features.

if the number of their machine application types increases, the number of devices communicating in an M2M scheme (i.e., referred to as various names including M2M devices, M2M communication devices, Machine Type Communication (MTC) devices, etc.) may be increased in a network.

The machine application types include (1) security, (2) public safety, (3) tracking and tracing, (4) payment, (5) health care, (6) remote maintenance and control, (7) metering, (8) consumer device, (9) fleet management in Pointer Of Sales (POS) and security-related application markets, (10) M2M communication of a vending machine, (11) smart metering of remotely monitoring machines and facilities and automatically measuring heat consumption or electricity consumption, (12) surveillance video communication of a surveillance camera, etc. However, the machine application types are not limited thereto and many other machine application types are available.

Another characteristic of an M2M device is that the M2M device has low mobility or is almost stationary after installation. That is, the M2M device is stationary for a very long time. An M2M communication system may simplify or optimize mobility-related operations for a specific M2M application characterized by position fixedness, such as secured access and surveillance, public safety, payment, remote maintenance and control, metering, etc.

As the number of such machine application types increases, the number of M2M communication devices may be increased rapidly, compared to the number of general mobile communication devices. Accordingly, if every individual M2M communication device communicates with a BS, too much overhead may be imposed on radio interfaces and/or a network.

Embodiments of the present invention will be described in the context of M2M communication in a wireless communication system (e.g., P802.16e, P802.16m, P802.16.1b, P802.16p, etc.), which should not be construed as limiting the present invention. The present invention is also applicable to other communication systems such as 3GPP LTE/LTE-A.

Figure 1:
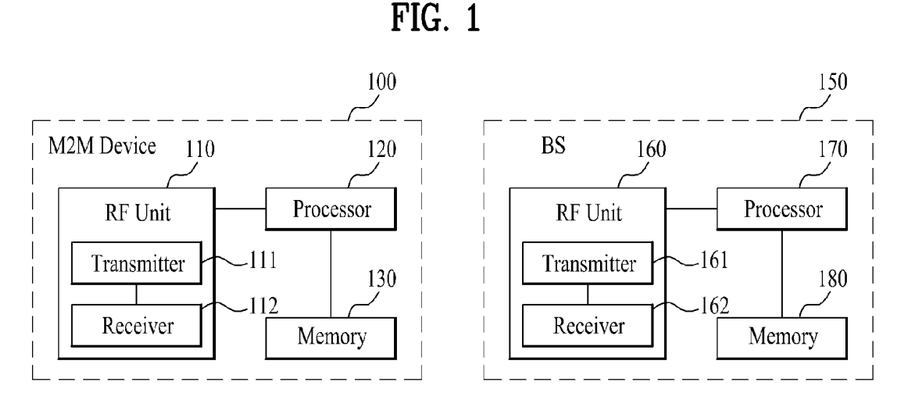
FIG. 1 is a block diagram of a Machine to Machine (M2M) device and a Base Station (BS) according to an embodiment of the present invention.

FIG. 1 is a block diagram of an M2M device and a BS according to an embodiment of the present invention.

Referring to FIG. 1, an M2M device 100 and a BS 150 may include Radio Frequency (RF) units 110 and 160, processors 120 and 170, and optionally, memories 130 and 180. While the configurations of one M2M device and one BS are illustrated in FIG. 1, an M2M communication environment may be built between a BS and a plurality of M2M devices.

Each of the RF units 110 and 160 may include a transmitter 111 or 161 and a receiver 112 or 162. The transmitter 111 and the receiver 112 of the M2M device 100 are configured to transmit a signal to and receive a signal from the BS 150 and other M2M devices. The processor 120 may be functionally connected to the transmitter 111 and the receiver 112 and may control the transmitter 111 and the receiver 111 to transmit and receive signals to and from other devices. In addition, the processor 120 may subject a transmission signal to processes, transmit the processed transmission signal to the transmitter 111, and process a signal received at the receiver.

When needed, the processor 120 may store information included in an exchanged message in the memory 130. The M2M device 100 having the configuration may perform methods according to various embodiments of the present invention.

While not shown in FIG. 1, the M2M device 100 may include various additional components according to its machine application type. For example, if the M2M device 100 is used for smart metering, the M2M device 100 may include an additional component for power measurement. The power measurement operation may be controlled by the processor 120 illustrated in FIG. 1 or a separately configured controller (not shown).

While communication is conducted between the M2M device 100 and the BS 150 in FIG. 1, M2M communication may take place between one or more M2M devices according to the present invention. Each device may have the same configuration as illustrated in FIG. 1 and may perform methods according to various embodiments described below.

The transmitter 161 and the receiver 162 of the BS 150 are configured to transmit and receive signals to and from another BS, an M2M server, and M2M devices. The processor 170 may be configured to be functionally connected to the transmitter 161 and the receiver 162 so that the processor 170 may control the transmitter 161 and the receiver 162 to transmit and receive signals to and from other devices. The processor 170 may subject a transmission signal to processes and transmit the processed transmission signal to the transmitter 161 and may process a signal received at the receiver 162. When needed, the processor 170 may store information included in an exchanged message in the memory 130. The BS 150 having the configuration may perform the afore-described methods according to various embodiments of the present invention.

The processors 120 and 170 of the M2M device 110 and the BS 150 instruct (e.g., control, adjust, manage, etc.) operations of the M2M device 110 and the BS 150, respectively. The processors 120 and 170 may be connected to the memories 130 and 180 that store program code and data. The memories 130 and 180 are connected to the processors 120 and 170 and store Operating Systems (OSs), applications, and general files.

The processors 120 and 170 of the present invention may be referred to as controllers, microcontrollers, microprocessors, microcomputers, etc. Meanwhile, the processors 120 and 170 may be implemented in hardware, firmware, software, or a combination thereof In a hardware configuration, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. that are configured to implement the present invention may be included in the processors 120 and 170.

In a firmware or software configuration, the firmware or software may be implemented in the form of a module, a procedure, a function, etc. performing the above-described functions or operations. The firmware or the software may be provided in the processors 120 and 170 or stored in the memories 130 and 180 and executed by the processor 120 or 170.

2. Cooperative Transmission Between M2M Devices

A large number of M2M devices may be located within the coverage area of a BS. If the BS transmits and receives data to and from all of the M2M devices, a network may suffer from overhead and as a result, there may be a shortage of radio resources to be allocated to the M2M devices. Accordingly, embodiments of the present invention provide methods for grouping M2M devices into M2M groups each including a predetermined number of M2M devices, selecting a representative M2M device from each M2M group, and enabling the representative M2M device to perform network reentry on behalf of the M2M devices of the M2M group.

In the embodiments of the present invention, the representative M2M device of each M2M group will be referred to as a Group Delegator (GD) and the other M2M devices of the M2M group will be referred to as Group Members (GMs). The term GD may be replaced with Anchor Device (AD) or Cooperative Device (CD).

In the embodiments of the present invention, cooperative transmission between M2M devices refers to a technique of assisting with data transmission of other M2M devices by a specific M2M device. Particularly, a CD is an M2M device supporting low-power M2M devices to reduce UL path loss and related transmission power consumption of the low-power M2M devices by cooperative transmission.

A cooperative transmission mode of the GD (i.e. the CD) is designed to support a Source Device's (SD's) (i.e., a GM's) reception of UL data and/or control information and relaying to a BS. The cooperative transmission mode is performed in both the GD and the GM.

Figure 2:
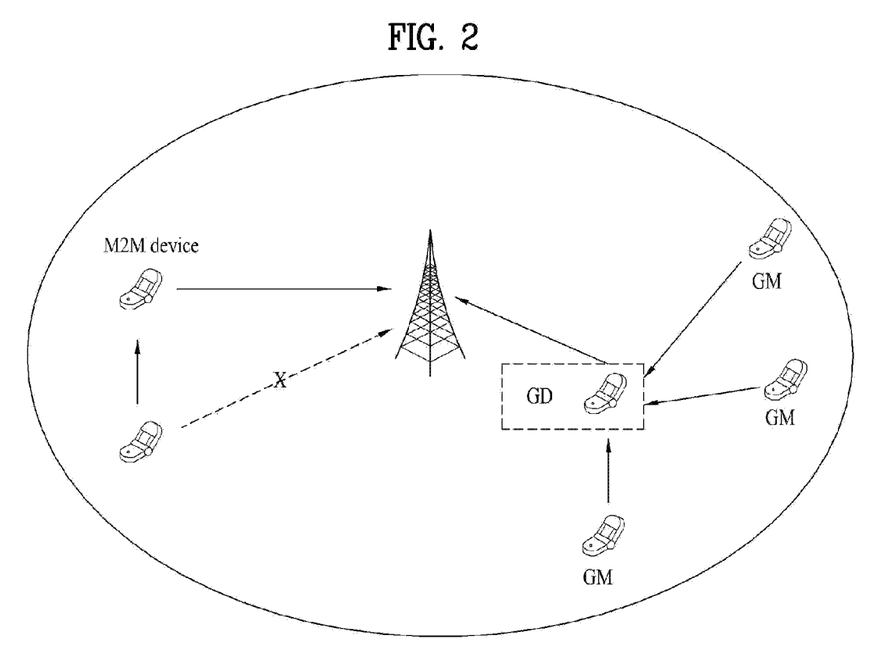
FIG. 2 illustrates an exemplary cooperative transmission through a Group Delegator (GD) that can be used in the present invention.

FIG. 2 illustrates an exemplary cooperative transmission through a GD that can be used in the present invention.

Referring to FIG. 2, a plurality of M2M devices may be located in the cell area of a BS. Fixed M2M devices include a battery-type M2M device and an M2M device connected to a power source. While the M2M device connected to a power source may be less limited in power consumption than the battery-type M2M device, the power consumption of the battery-type M2M device is strictly limited.

Particularly for fixed M2M devices, energy consumption and a related battery lifetime may vary depending on the geographical location of each device. For example, M2M devices at a cell edge consume much power in data transmission because the M2M devices are remote from a BS. Thus, it is necessary to often change the batteries of the M2M devices, compared to M2M devices inside the cell of the BS.

In this case, if the M2M devices (i.e. GMs) communicate with the BS through a GD connected to a power source, their power consumption may be reduced. That is, the GD collects data traffic of the GMs and transmits the collected data traffic to the BS so that the GMs may have only to transmit data to the GD relatively near to the GMs, thereby reducing power consumption. The resulting balancing of the power consumption of the fixed M2M devices may lengthen a network lifetime.

Figure 3:
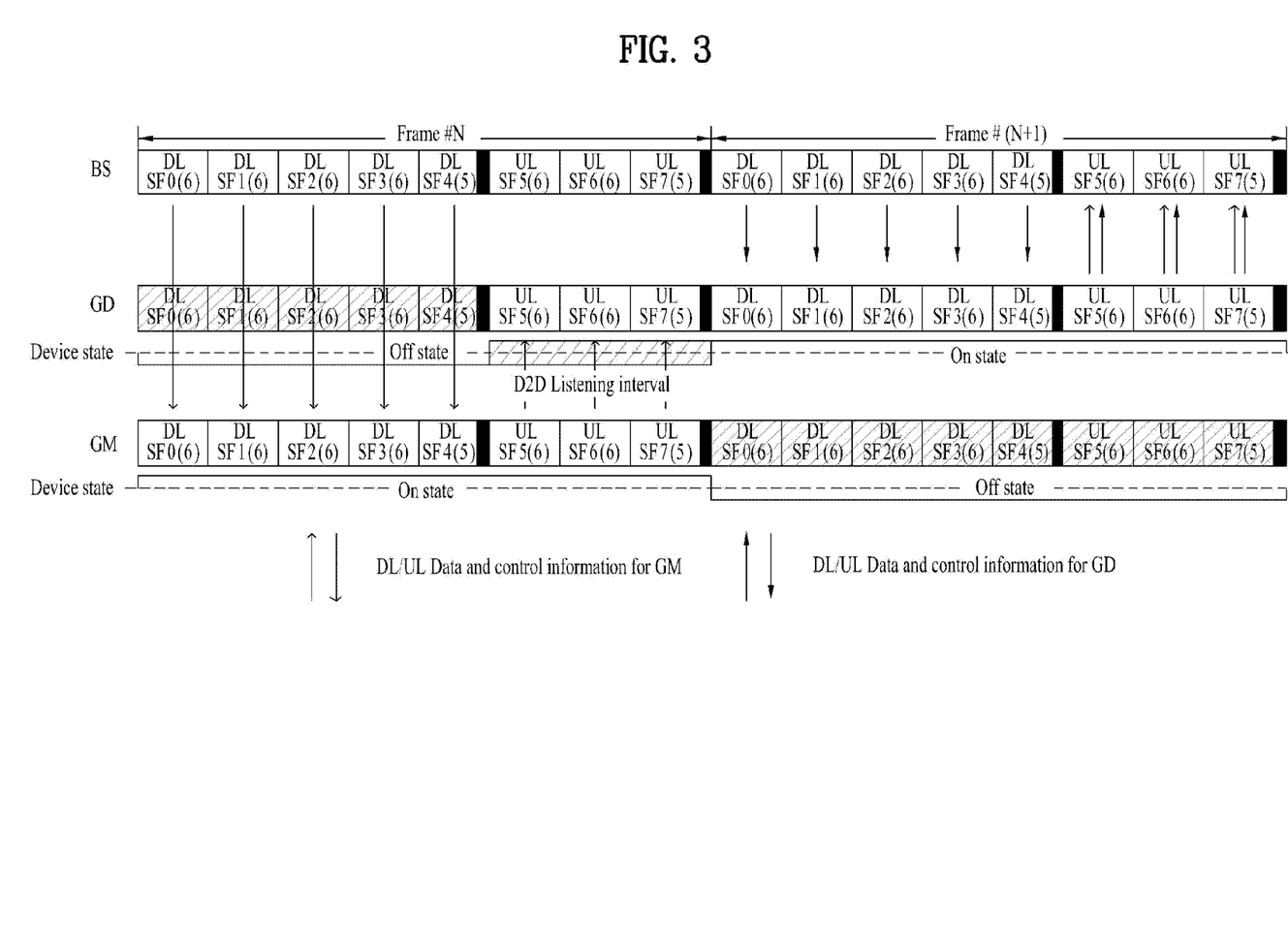
FIG. 3 illustrates an exemplary frame structure that can be used in embodiments of the present invention.

FIG. 3 illustrates an exemplary frame structure that can be used in embodiments of the present invention.

Referring to FIG. 3, one frame includes five DL subframes and three UL subframes. Each frame structure may be used from the perspective of each of network components, BS, GD, and GM. In FIG. 3, a GD may be referred to as a CD and a GM may be referred to as an SD.

A GD may transmit and receive data and/or control information to and from GMs. The GD may also transmit and receive data and/or control information to and from a BS. When the GD receives UL data from GMs, the GD should discontinue UL data transmission to the BS. This halt interval may be configured in units of a subframe or a frame.

Referring to FIG. 3, the BS may transmit DL data and/or control information directly to the GD or a GM or to the GM through the GD. The GD and the GM may operate in On state and Off state. The GD and the GM may receive DL data and transmit UL data only in the On state.

For example, the GD may receive DL data and/or control information from the BS and transmit UL data and/or control information to the BS in the On state. The GM may also may receive DL data and/or control information from the BS and transmit UL data and/or control information to the BS in the On state.

3. Method for Selecting GD

In selecting a GD for a group of M2M devices, it is preferable to support fixedness and mobility of the M2M group. The GD may be selected in advance during initial network entry and the same ranging code may be allocated to each GD. In this case, since the GD is fixed as a specific M2M device, GD reselection is not needed in the event of network reentry in idle mode.

Or M2M devices may select a GD randomly during network reentry. For example, a BS may transmit a specific threshold to each M2M device and the M2M devices may select a GD randomly based on the specific threshold. In this case, each time the M2M devices reenter the network, a GD should be reselected.

Now, a detailed description will be given of methods for selecting a GD randomly during network reentry.

Figure 4:
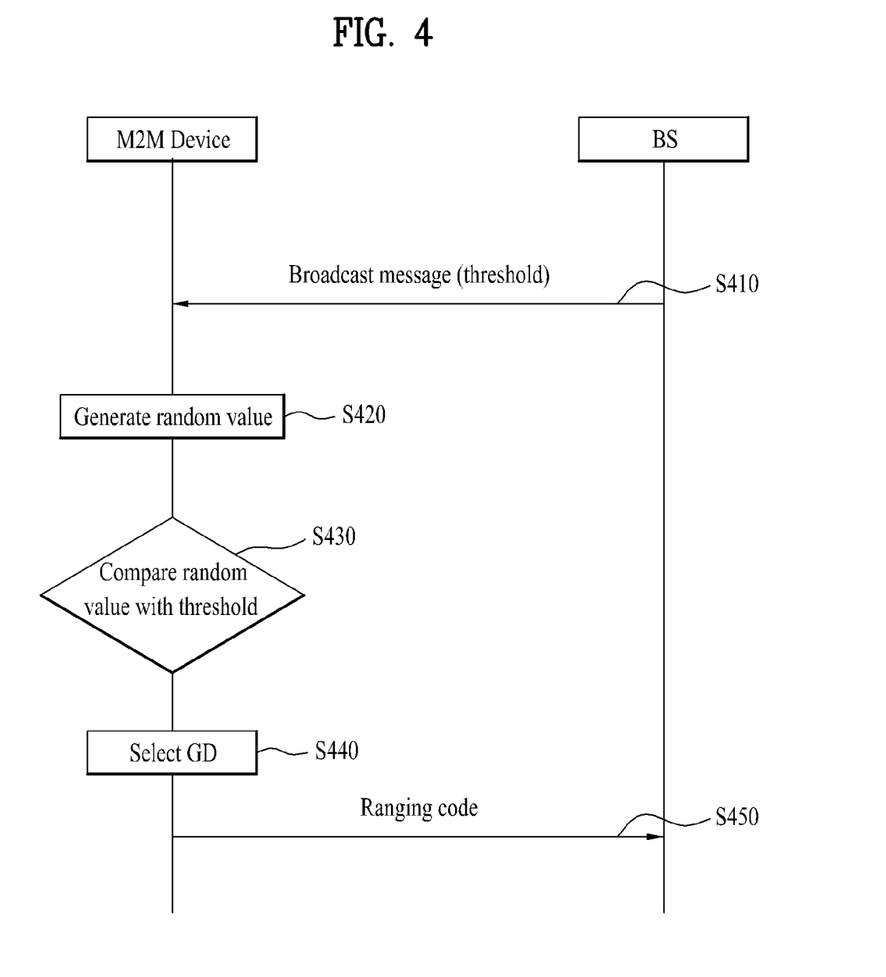
FIG. 4 illustrates one of methods for selecting a GD according to an embodiment of the present invention.

FIG. 4 illustrates one of methods for selecting a GD according to an embodiment of the present invention.

Referring to FIG. 4, one or more M2M groups may exist within the service area of a BS and one M2M group may include a plurality of M2M devices. The GD selection method of FIG. 4 may be performed in the context of the frame structure illustrated in FIG. 3.

For GD selection, the BS transmits a broadcast message including a specific parameter that indicates a threshold value to M2M devices (S410).

In step S410, the threshold value may be Random Selection Probability set to θ. The broadcast message may be an Advanced Air Interface-System Configuration Descriptor (AAI-SCD) message or an M2M Group MAC Control (MGMC) message.

Each M2M device generates a random value m to select a GD (S420).

The M2M device compares the random value m with the threshold value θ broadcast by the BS (S430) and a specific M2M device may be selected as a GD according to a predetermined criterion (S440).

For example, if a random value m generated by a specific M2M device in step S430 is larger than the threshold value θ, the M2M device becomes the GD and if the random value m is equal to or smaller than the threshold θ, the M2M device operates as a GM.

It may be further contemplated that if a random value m generated by a specific M2M device in step S430 is equal to or smaller than the threshold θ, the M2M device becomes the GD and if the random value m is larger than the threshold θ, the M2M device operates as a GM.

Therefore, the M2M device selected as the GD transmits a ranging code to the BS on behalf of its M2M group, for network reentry to the BS (S450).

In step S450, the GD may select a specific superframe based on an Identifier (ID) of the M2M group, M2M Group Identifier (MGID) and transmit a dedicated ranging code in the selected superframe to the BS.

Then the GD may receive a ranging message including group information from the BS in response to the transmitted dedicated ranging code. The group information may indicate a Success, an Abort, or a Continue as ranging status information. If the group information indicates the Abort or the Continue, the GD is maintained as it is and a GD ID is not changed. On the other hand, if the group information indicates the Success, the GD returns to the status of a GM.

3.1. Method for Reselecting GD

In the absence of any M2M device having a random value larger than the threshold indicated by the specific parameter in step S430 of FIG. 4, how to select a GD becomes an issue. In addition, if two or more M2M devices have random values larger than the threshold value, which M2M device should be selected as a GD becomes an issue.

Various methods for reselecting a GD in a situation requiring GD reselection will be described below in detail.

3.1.1 GD Reselection Method—1

If a GD has not been selected for an M2M group, the M2M devices of the M2M group may not transmit a ranging code to a BS. Due to the absence of a GD, GMs being M2M devices not selected as a GD may not receive any information for the M2M group from the BS.

The BS is not able to detect a dedicated ranging code for the M2M group due to the absence of a GD for the M2M group. Then the BS may change a specific parameter for GD selection, determining that a GD has not been selected for the M2M group.

For example, the BS may change a specific parameter (e.g., increases a threshold value) and broadcast a broadcast message including the changed parameter to the M2M devices of the M2M group. Subsequently, the GMs may reselect a GD by performing steps S420, S430, and S440 based on the changed parameter.

3.1.2 GD Reselection Method—2

A GD broadcasts a GD Indication (GDI) message including the ID of the GD to all members of its M2M group. If GMs fail to receive the GDI message within a predetermined time interval, the GMs may regenerate random values to reselect a GD and perform steps S420 through S450.

3.1.3 GD Reselection Method—3

Upon generation of an event triggering network reentry, GMs may start a timer. The timer may set to a time period during which a ranging message (e.g., Advanced Air Interface Ranging Acknowledgement (AAI-RNG-ACK) or Advanced Air Interface Ranging Response (AAI-RNG-RSP)) is to be received from a BS in response to a ranging code transmitted by a GD.

If the GMs fail to receive the ranging message from the BS until expiration of the timer (e.g. a time period during which the AAI-RNG-ACK message is to be received) or another preset time period (in the case of ranging retransmission), the GMs may automatically re-generate random values and perform the GD reselection operation described before with reference to FIG. 4.

3.1.4 GD Reselection Method—4

If GMs fail to detect a ranging message from a GD even though the GMs are capable of detecting or receiving the ranging message from the GD, the GMs may re-generate random values for GD selection.

3.1.5 GD Reselection Method—5

If a BS has not received any ranging code (or a GDI) from a GD during a predetermined time period (e.g., a GD ranging reception timer value), the BS may retransmit a changed specific parameter (i.e., a value different from an existing parameter value) for GD reselection to M2M devices by a broadcast message. The changed parameter may be transmitted in a broadcast message (e.g., AAI-RNG-ACK, AAI-SCD, or Secondary SuperFrame Header (S-SFH)).

3.2 Method for Controlling Ranging Failure

It may occur that all GDs fail to transmit ranging codes. For example, a ranging message (e.g., AAI-RNG-ACK) being a response message to a ranging code may not include group information.

In this case, all of the GDs may retransmit the ranging codes. An AAI-RNG-ACK message may include information about a specific (backoff) window size and the GDs may attempt retransmission of the ranging codes within the backoff window size. Or the GDs may re-use backoff window information transmitted in a broadcast message (e.g., S-SFH or AAI-SCD).

4. Method for Network Reentry for M2M Group

If a large number of M2M devices are located within the cell area of a BS and the individual M2M devices perform network reentry to the BS, network congestion may rapidly increase. In the present invention, network reentry may be performed on an M2M group basis to reduce network congestion. A GD of an M2M group may perform an initial ranging access procedure for initial network reentry to the BS on behalf of the GMs of the M2M group.

Figure 5:
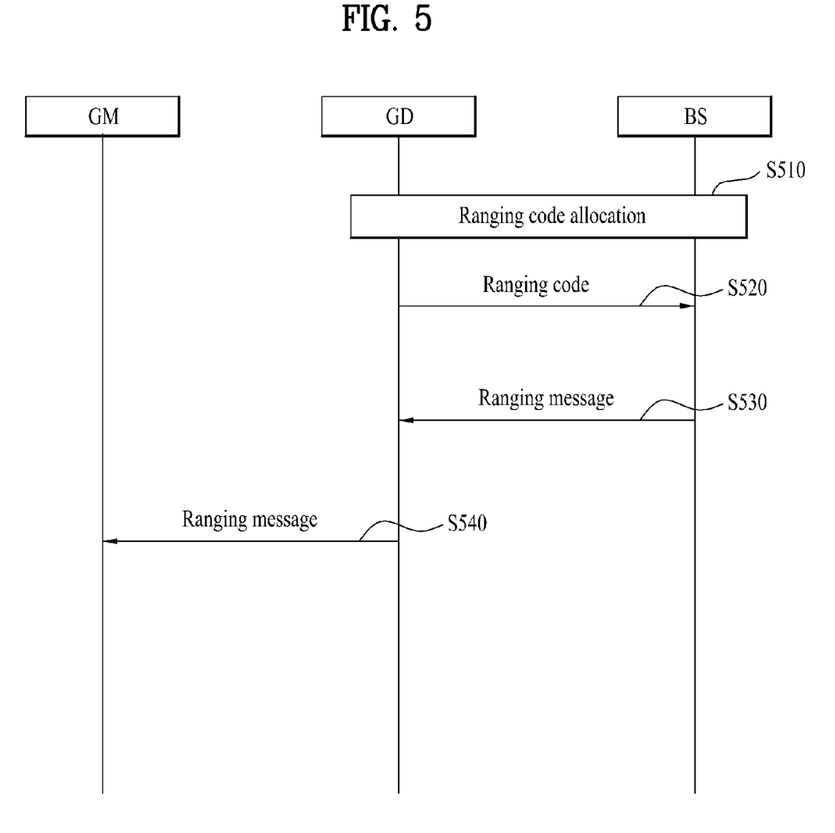
FIG. 5 illustrates one of methods for performing network reentry using a GD according to an embodiment of the present invention.

FIG. 5 illustrates one of methods for performing network reentry using a GD according to an embodiment of the present invention.

Referring to FIG. 5, a GD may be selected from an M2M group. The GD may be selected or reselected in one of the methods described before in Clause 3. The method of FIG. 5 may be performed in the context of the frame structure described with reference to FIG. 3.

A BS may allocate a dedicated ranging code to the GD and transmit information about the allocated dedicated ranging code to the GD and/or each M2M device of the M2M group (S510).

If the M2M group is supposed to report data about the M2M group or is paged, the GD of the M2M group may transmit the ranging code using the MGID of the M2M group (S520).

Upon receipt of the ranging code, the BS may transmit a ranging message (e.g., AAI-RNG-ACK or AAI-RNG-RSP) to the GD. The ranging message may include ranging status information as group information about the M2M group. The ranging status information indicates a Success, an Abort, or a Continue as the ranging status of the M2M group for network reentry.

Upon receipt of the ranging message, the GD transmits the ranging message to each GM (S540).

If the GMs receive a ranging message with ranging status information set to the 'Success', the GMs may perform a network reentry procedure with the BS using general or dedicated ranging resources. The GMs may perform network reentry to the BS using a legacy ranging code or a new ranging code and may select a backoff value randomly within an initial backoff window for network entry.

If the GMs receive a ranging message with ranging status information set to the 'Abort', the GMs may start a ranging abort timer and abort ranging until expiration of the ranging abort timer. After expiration of the ranging abort timer, the M2M group resumes ranging through the GD.

If the GMs receive a ranging message with ranging status information set to the 'Continue', the GMs adjust ranging parameters based on parameters included in the ranging message and continue ranging using the adjusted parameters.

Upon detection of occurrence of a specific event to the M2M group, the GMs may start a ranging reception timer (e.g., a T32 timer). The GMs await reception of a ranging message during a time period set for the ranging reception timer. Upon receipt of a ranging message in response to a dedicated ranging code, the GMs initiate the network reentry procedure. On the other hand, if the GMs fail to receive a ranging message during the time period of the ranging reception timer, the GMs may perform the network reentry procedure autonomously after expiration of the ranging reception timer.

4.1 Method for Allocating Ranging Code

Methods for allocating a ranging code for use in step S510 will be described below in detail.

A BS and/or a GD may select a ranging code and a superframe based on an MGID. A ranging opportunity may be selected according to the MGID. However, if the BS does not allocate a GD-dedicated ranging code except for a conventional 32 code sets, a ranging code may be identified by a 5-bit code index. That is, up to 32 groups may be identified without overlap.

The 32 groups include 375 devices per group on an average (about 1200 devices). Therefore, access congestion still occurs in an M2M group and is to be overcome. For example, it is necessary to increase the number of groups or develop a scheme for solving the congestion problem within a group.

4.1.1 Method for Allocating Dedicated Ranging Code

A GD-dedicated ranging code may be allocated to a GD. A ranging opportunity may be spread in the time domain. Or different ranging codes may be allocated to different GDs and a ranging opportunity may be spread in the time domain. Preferably, the GD of each M2M group is paged with a sufficiently separated time offset.

4.1.2 Method for Using Legacy Ranging Code

A description will be given of a method for allocating a ranging code only using 32 code sets for legacy ranging codes, without considering a dedicated ranging code.

A BS may allocate 5 bits (Most Significant Bits (MSBs) or Least Significant Bits (LSBs)) for ranging code identification and 10 bits (MSBs or LSBs) for time extension to a GD. The 10 bits may be used only for the purpose of time extension. For example, up to 1024 offsets in 10 bits may be used to determine a superframe for a ranging slot.

Or the 10 bits for time extension may represent a preset time reference value (offset) known to all devices. Herein, a used superframe offset starts from the first superframe of an S-SFH changing period. The superframe offset=(MGID mod S-SFH changing period). For example, the superframe offset may range from 512 superframes (=32×16 in the worst case) to 2048 superframes (=32×64).

Frames (or subframes) used in a selected superframe may be configured according to various ranging transmission configurations.

4.1.3 Method for Selecting Time Extension and Random Ranging Code or Using 15-bit Ranging Code Allocated to GD During Initial Network Entry In a simple time extension method for a ranging code, up to 32768 offset values in 15 bits may be used to determine a superframe for a ranging slot.

Or a ranging code may be time-extended using a preset time reference value known to all devices. In this case, a used superframe offset starts from the first superframe of an S-SFH changing period. The superframe offset=(MGID mod S-SFH changing period). If a BS does not allocate an already-allocated ranging code of a GD, this method does not perform well, compared to the method described in Clause 4.1.2.

4.1.4 Method for Reattempting Ranging in the Event of Ranging Failure

Even though superframes for ranging code transmission are distinguished between GDs, some superframes may overlap with each other inevitably. If a BS may not detect ranging codes from different GDs, ranging messages (e.g., AAI-RNG-ACK or AAI-RNG-RSP) related to the GDs may not be distinguished.

To solve this problem, the following method may be considered.

If a ranging message (e.g., AAI-RNG-ACK or AAI-RNG-RSP) includes group information (e.g., ranging status information, a frame ID, or a Ranging Preamble (RP) code index), a GD may determine that ranging has been successful, based on the group information.

If the group information indicates that ranging of the GD has been failed (Abort), the ranging message may further include information about a specific backoff window size. The GD may reattempt network reentry within the backoff window size. Or the GD may reuse backoff window information received in an S-SFH message or an AAI-SCD message.

Or if the group information indicates that the ranging of the GD has been failed (Abort), a ranging message (e.g., AAI-RNG-ACK) may include an offset for the GD different from offsets of other GDs or information about a used frame/superframe index. Then the GD may reattempt ranging for network reentry in a frame (or superframe) indicated by the offset or the frame index (or superframe index).

Figure 6:
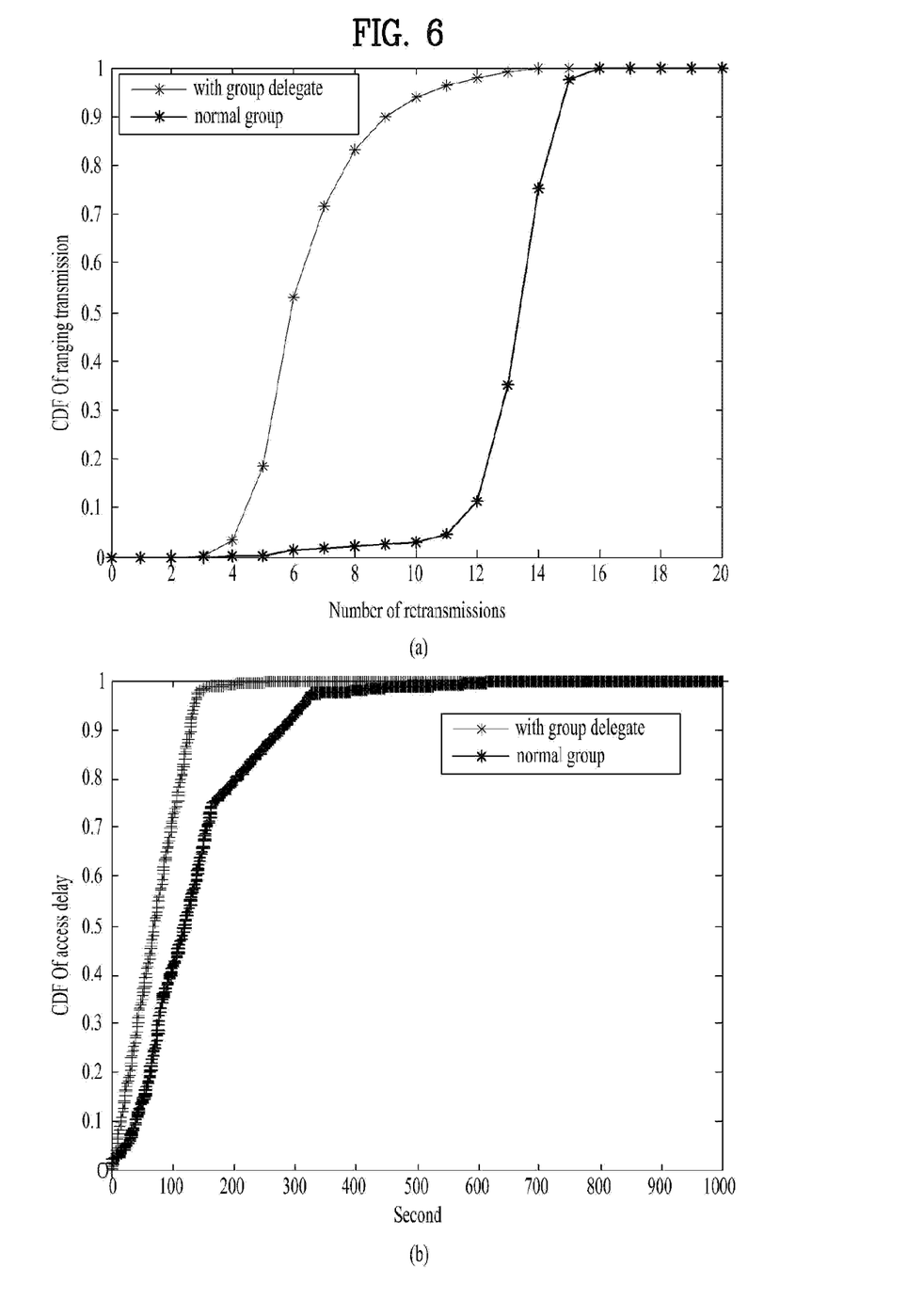
FIGS. 6(a) and 6(b) illustrate effect differences between an M2M group using a GD according to the present invention and a normal M2M group that does not use a GD.

FIGS. 6(a) and 6(b) illustrate effect differences between an M2M group using a GD according to the present invention and a normal M2M group that does not use a GD.

Particularly, the horizontal axis represents the number of retransmissions and the vertical axis represents the Cumulative Distribution Function (CDF) of ranging transmission in FIG. 6(a), and the horizontal axis represents time in units of seconds and the vertical axis represents the CDF of ranging access delay in FIG. 6(b). In FIGS. 6(a) and 6(b), the M2M group with a GD is marked with a weak solid line and the normal M2M group without a GD is marked with a bold solid line.

Referring to FIG. 6(a), while 90% of M2M devices have an access retransmission number of 7 in the M2M group that performs network reentry through a GD, 90% of M2M devices have an access retransmission number of 14 in the normal M2M group. Referring to FIG. 6(b), it is noted that the M2M group with a GD suffers from a shorter access delay than the normal M2M group without a GD.

Accordingly, it may be concluded that network reentry through a GD outperforms network reentry of a normal M2M group. As a result, the GD-based network reentry reduces an access delay and the power consumption of M2M devices according to the present invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for selecting a Group Delegator (GD) in a wireless access system supporting a Machine to Machine (M2M) communication, the method performed by a M2M device and comprising:
   if the M2M device which is a Group Member (GM) of an M2M group does not receive any information related to a ranging code used for a network reentry from a Base Station (BS), receiving a broadcast message including a second threshold changed from a first threshold used for selecting the GD of the M2M group;
   generating a random value for selecting the GD;
   reselecting the GD by comparing the second threshold with the random value, wherein
   if the second threshold is equal to or larger than the random value, the M2M device is selected as the GD, and
   if the second threshold is smaller than the random value, the M2M device continues to operate as the GM of the M2M group;
   starting a timer according to a detection of ranging code transmission from the reselected GD to the BS; and
   performing a predetermined procedure for the network reentry to the BS after the timer is expired, if a ranging response message in response to the ranging code sent by the reselected GD has not been received by the M2M device.

2. The method according to claim 1, further comprising, if the M2M device is selected as the GD, transmitting the ranging code for the network reentry on behalf of the M2M group.

3. The method according to claim 1, wherein the broadcast message is a System Configuration Descriptor (SCD) message or a M2M Group MAC Control (MGMC) message.

4. A Machine to Machine (M2M) device for selecting a Group Delegator (GD) in a wireless access system supporting a M2M communication, the M2M device comprising:
   a Radio Frequency (RF) unit; and
   a processor supporting GD selection,
   wherein if the M2M device which is a Group Member (GM) of an M2M group does not receive any information related to a ranging code used for a network reentry from a Base Station (BS), the M2M device receives a broadcast message including a second threshold changed from a first threshold used for selecting the GD of the M2M group, generates a random value for selecting the GD through the processor, and reselects the GD by comparing the second threshold with the random value, wherein
   if the second threshold is equal to or larger than the random value, the M2M device is selected as the GD, and
   if the second threshold is smaller than the random value, the M2M device continues to operate as the GM of the M2M group; and wherein the processor is configured to start a timer according to a detection of ranging code transmission from the reselected GD to the BS and to perform a predetermined procedure for the network reentry to the BS after the timer is expired, if a ranging response message in response to the ranging code sent by the reselected GD has not been received by the M2M device.

5. The M2M device according to claim 4, wherein if the M2M device is selected as the GD, the M2M device transmits the ranging code for the network reentry through the RF unit on behalf of the M2M group.

6. The M2M device according to claim 5, wherein the broadcast message is a System Configuration Descriptor (SCD) message or a M2M Group MAC Control (MGMC) message.

* * * * *